(12) United States Patent
Johri et al.

(10) Patent No.: US 10,479,349 B2
(45) Date of Patent: Nov. 19, 2019

(54) METHODS AND SYSTEM FOR LAUNCHING A HYBRID VEHICLE

(71) Applicant: Ford Global Technologies, LLC, Dearborn, MI (US)

(72) Inventors: Rajit Johri, Canton, MI (US); Minku Lee, Ypsilanti, MI (US); Justin Panhans, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/618,972

(22) Filed: Jun. 9, 2017

(65) Prior Publication Data

US 2018/0354493 A1 Dec. 13, 2018

(51) Int. Cl.
| | |
|---|---|
| *B60W 20/19* | (2016.01) |
| *B60W 20/13* | (2016.01) |
| *B60W 10/02* | (2006.01) |
| *B60W 10/06* | (2006.01) |
| *B60W 10/08* | (2006.01) |
| *B60W 30/18* | (2012.01) |
| *F16H 61/48* | (2006.01) |
| *F16H 59/18* | (2006.01) |
| *F16H 59/54* | (2006.01) |

(52) U.S. Cl.
CPC ......... *B60W 20/19* (2016.01); *B60W 10/023* (2013.01); *B60W 10/06* (2013.01); *B60W 10/08* (2013.01); *B60W 20/13* (2016.01); *B60W 30/18027* (2013.01); *F16H 61/48* (2013.01); *B60W 2510/244* (2013.01); *B60W 2520/30* (2013.01); *B60W 2540/10* (2013.01); *B60W 2540/12* (2013.01); *B60W 2710/027* (2013.01); *B60W 2710/0666* (2013.01); *B60W 2710/083* (2013.01); *B60W 2710/1083* (2013.01); *B60Y 2200/92* (2013.01); *F16H 59/18* (2013.01); *F16H 59/54* (2013.01); *F16H 2312/02* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 4,441,573 A | * | 4/1984 | Carman | B60K 6/12 180/165 |
| 4,967,884 A | * | 11/1990 | Norcia | F16D 48/02 192/103 F |
| 5,471,894 A | * | 12/1995 | McFadden | F16H 59/04 477/115 |
| 5,980,428 A | * | 11/1999 | Liu | B60W 10/02 477/174 |

(Continued)

FOREIGN PATENT DOCUMENTS

WO WO-0079119 A1 * 12/2000 .......... F20D 33/006

*Primary Examiner* — Rami Khatib
(74) *Attorney, Agent, or Firm* — David Kelley; McCoy Russell LLP

(57) ABSTRACT

Systems and methods for launching a hybrid vehicle that includes a motor/generator and an automatic transmission with a torque converter are described. The systems and methods may permit improved vehicle acceleration to enhance hybrid vehicle performance during specific vehicle launch conditions. The launch conditions may be established based on brake pedal position and accelerator pedal position.

17 Claims, 5 Drawing Sheets

(56) References Cited

U.S. PATENT DOCUMENTS

| | | | |
|---|---|---|---|
| 6,440,041 B1 | 8/2002 | Riedle et al. | |
| 8,027,780 B2 | 9/2011 | Whitney et al. | |
| 8,167,771 B2 * | 5/2012 | Roses | B60K 6/48 477/5 |
| 8,831,859 B2 * | 9/2014 | Meitinger | B60W 10/06 701/110 |
| 9,067,587 B1 * | 6/2015 | Johri | B60W 20/10 |
| 9,988,038 B2 * | 6/2018 | Zhang | F16H 61/48 |
| 2012/0143455 A1 * | 6/2012 | Lee | B60K 28/10 701/84 |
| 2013/0296114 A1 * | 11/2013 | Nefcy | B60K 6/48 477/5 |
| 2014/0100727 A1 * | 4/2014 | Pietron | B60W 10/02 701/22 |
| 2014/0162838 A1 * | 6/2014 | Doering | B60W 20/40 477/5 |
| 2014/0257609 A1 * | 9/2014 | Dufford | B60W 10/06 701/22 |
| 2014/0357449 A1 * | 12/2014 | Weis | B60W 30/18027 477/99 |
| 2015/0066264 A1 * | 3/2015 | Wang | B60W 10/06 701/22 |
| 2015/0353098 A1 * | 12/2015 | Percy | B60W 50/16 701/53 |
| 2016/0052517 A1 * | 2/2016 | Connolly | B60W 10/023 701/22 |
| 2016/0121877 A1 * | 5/2016 | Hancock | B60K 6/48 477/5 |
| 2016/0257287 A1 | 9/2016 | Kato et al. | |

\* cited by examiner

METHODS AND SYSTEM FOR LAUNCHING A HYBRID VEHICLE

FIELD

The present description relates to methods and a system for operating a powertrain of a hybrid vehicle. The methods and systems may be particularly useful for performance oriented hybrid vehicles.

BACKGROUND AND SUMMARY

Hybrid vehicles may conserve fuel and reduce greenhouse gases by utilizing an electric motor to provide propulsive effort. Such attributes may be widely known, but a hybrid vehicle may also offer performance advantages. For example, torque of an electric machine may be combined with torque of an internal combustion engine to improve powertrain output and vehicle acceleration. Torques from the electric machine and from the internal combustion engine may be input to a transmission or combined by the transmission and supplied to vehicle wheels. If the internal combustion engine and electric machine provide torque sufficient to cause the vehicle's wheels to slip, the vehicle may not accelerate as fast as desired. Further, the amount of torque that it takes to produce wheel slip may vary based on road surface, tires, and ambient climate conditions. Conversely, if a vehicle driver is requesting a higher rate of vehicle acceleration and torque delivered to the wheels is less than what is needed to meet the higher rate of vehicle acceleration, then the vehicle may under perform. As such, it may be desirable to provide a way of launching a vehicle that provides a desired level of vehicle acceleration without wasting energy spinning wheels.

The inventors herein have recognized the above-mentioned issues and have developed a vehicle operating method, comprising: adjusting speed of a torque converter impeller from a first speed to a second speed in response to contemporaneously applying a brake pedal and an accelerator pedal.

By adjusting a speed of a torque converter impeller before launch of a vehicle in response to brake contemporaneously applied brake and accelerator pedals, it may be possible to improve launch of a hybrid vehicle. In particular, torque converter impeller speed may be adjusted to a stall speed of a torque convertor, or alternatively, to a speed where combined engine torque and electric machine torque is a maximum, before the vehicle is launched so that a time it takes to deliver powertrain torque to wheels may be shortened. Further, engine speed may be adjusted before launch so that engine speed is at a speed where engine torque may be maximized. As such, larger amounts of powertrain torque may be delivered to wheels sooner to improve vehicle acceleration. If wheel slip is experienced during vehicle launch, an electric machine may convert a portion of engine output torque to electrical power, thereby reducing an amount of power lost to wheel slip. Conversely, if engine torque is insufficient to generate wheel slip, the electrical machine may increase wheel torque so that wheel slip may be approached and so that vehicle acceleration enhanced.

The present description may provide several advantages. Specifically, the approach may improve vehicle acceleration during a high performance vehicle launch (e.g., acceleration from vehicle speed of zero until torque converter impeller speed is within a threshold speed of torque converter turbine speed). In addition, the approach may improve vehicle efficiency during a high performance vehicle launch. Further, the approach may provide an optimal amount of wheel slip.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
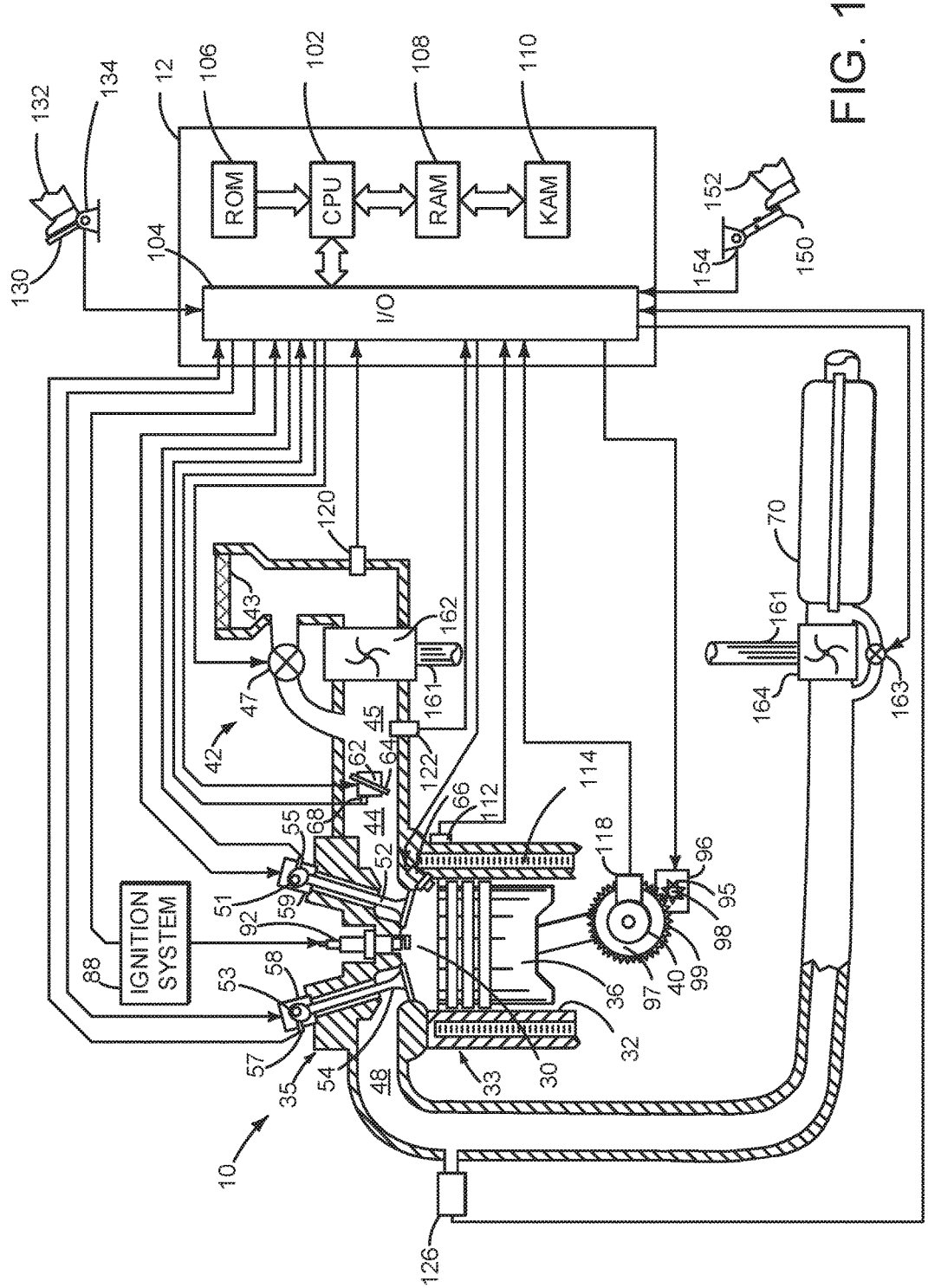
FIG. 1 is a schematic diagram of an engine.
Figure 2:
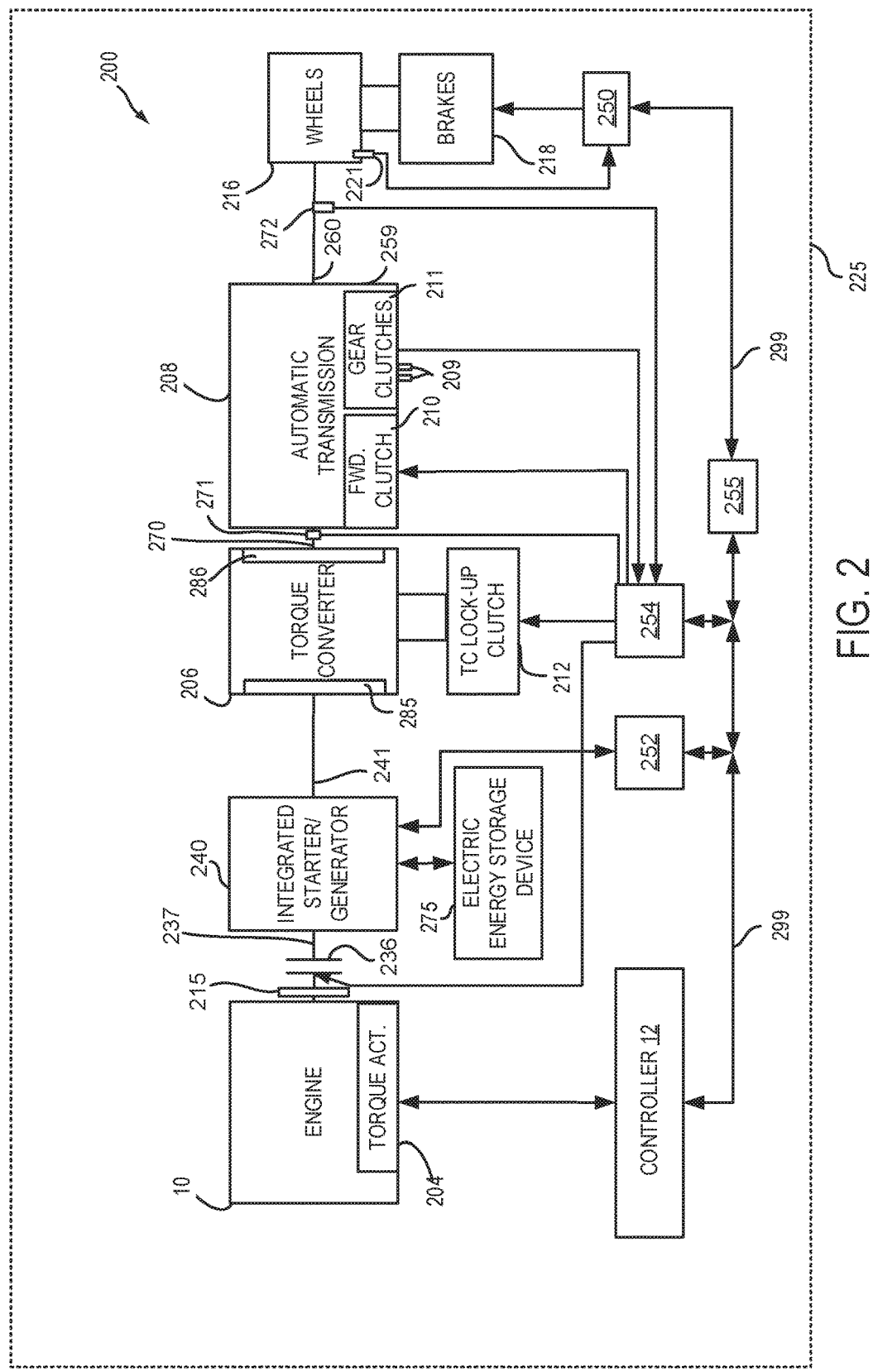
FIG. 2 is a schematic diagram of a hybrid vehicle powertrain.
Figure 3:
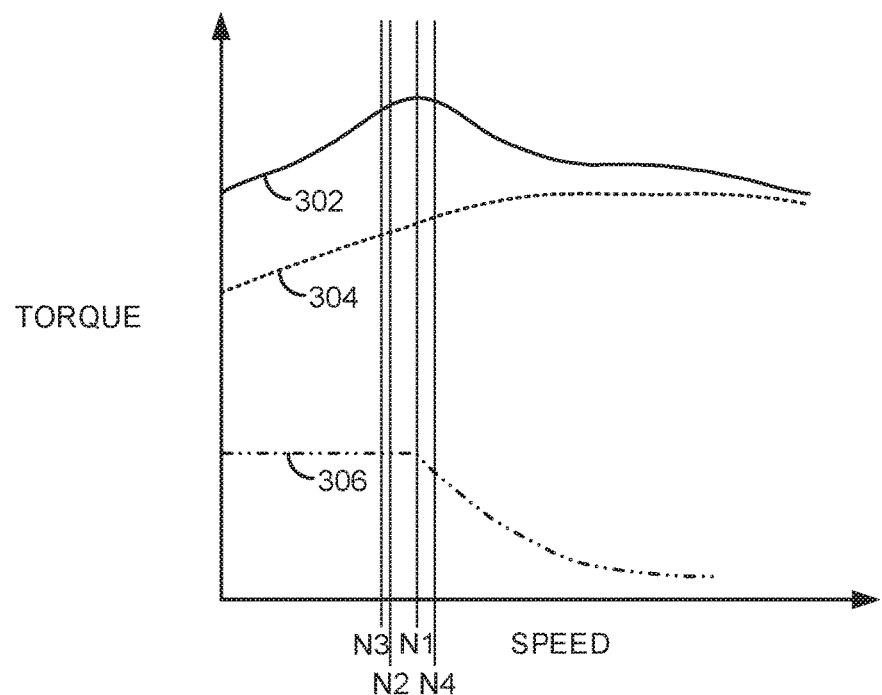
FIG. 3 shows a plot of example desirable torque converter impeller speeds.
Figure 4:
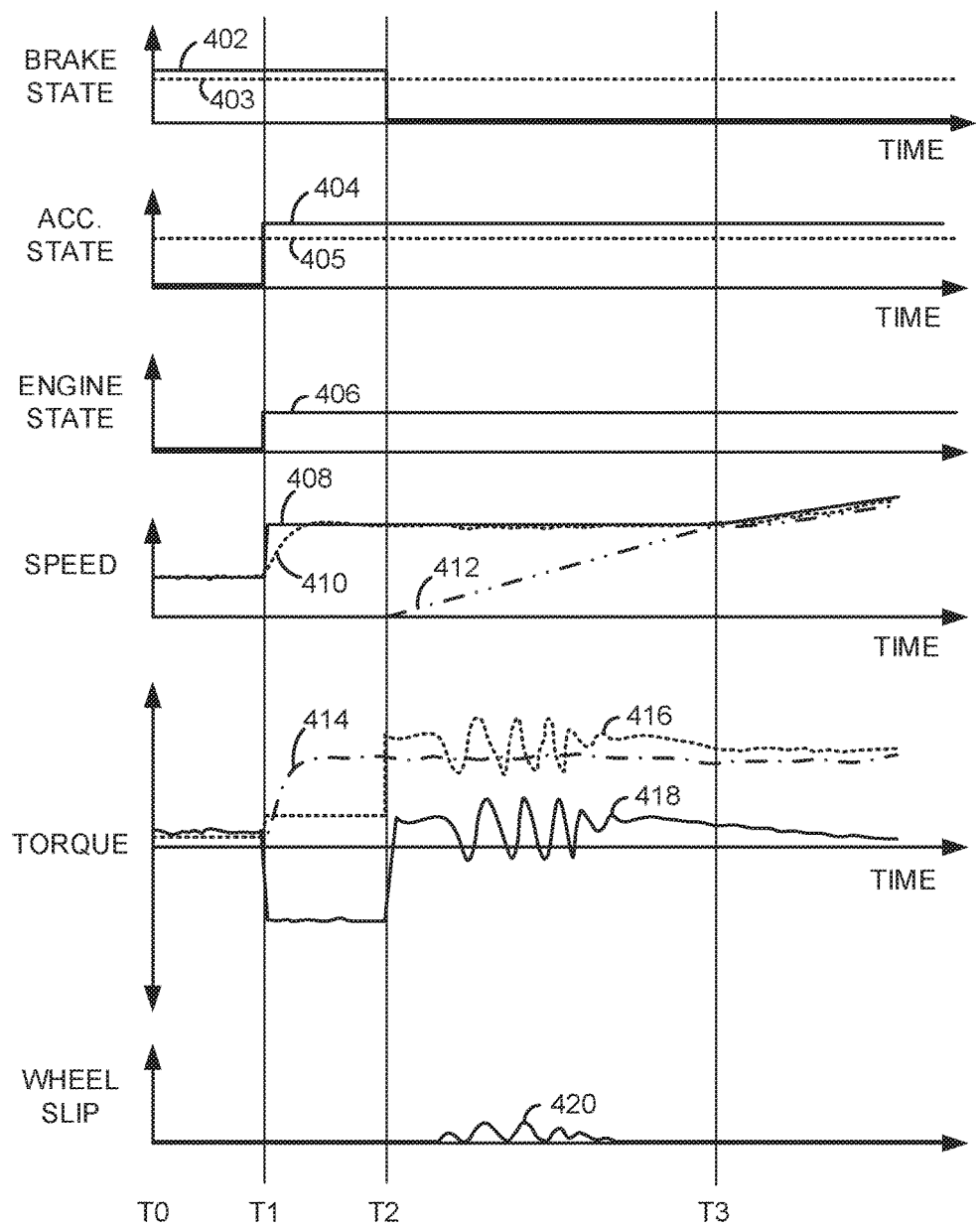
FIG. 4 shows a prophetic vehicle launch sequence.

The present description is related to improving launching of a hybrid vehicle. The hybrid vehicle may include an engine as is shown in FIG. 1. The engine of FIG. 1 may be included in a powertrain as is shown in FIG. 2. The powertrain may be operated at a speed as shown in FIG. 3 to launch a hybrid vehicle as shown in the sequence illustrated in FIG. 4. A prior art operating sequence is shown in FIG. 4. The powertrain may be operated according to the method shown in FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human 132; a position sensor 154 coupled to brake pedal 150 for sensing force applied by human 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a motor/generator; a transmission mechanically coupled to the engine and the motor/generator, the transmission including a torque converter impeller; and a controller including executable instructions stored in non-transitory memory to adjusting speed of the impeller from a first speed to a second predetermined speed in response to contemporaneously applying a brake pedal to provide greater than a threshold amount of driven wheel braking torque and applying an accelerator pedal to a position that is greater than a threshold. The system further comprises additional instructions to operate the engine at wide open throttle in response to releasing the applied brake pedal. The system further comprises additional instructions to modulate torque of the electric machine to control wheel slip in response to releasing the applied brake. The system further comprises additional instructions to cancel torque requested via the accelerator pedal in response to torque requested via the brake pedal when the accelerator pedal is at a position that is less than the threshold. The system further comprises additional instructions to adjust torque of the motor/generator to provide a desired torque converter impeller torque that rotates the torque converter impeller at the second predetermined speed.

Referring now to FIG. 3, several different speeds that a torque converter impeller may be adjusted to are shown. The plot has a vertical axis representing torque and a horizontal axis representing speed. The plot includes three traces 302-306 and four speeds N1-N4 which represent different desired torque converter impeller speed when a hybrid vehicle is operated in a launch control mode.

Curve 302 represent summed maximum engine and maximum electric machine (e.g., ISG) torques for the speeds shown when the engine and the electric machine are coupled and rotate at a same speed. Curve 304 represents a maximum engine torque curve for the speed range shown, and curve 306 represents a maximum electric machine torque curve for the speed range shown. The maximum summed engine torque and electric machine torque occurs at speed N1. As such, if the engine and electric machine are rotating at speed N1, they have capacity to provide positive torque ranging from zero to the torque at curve 302 at speed N1, which is a maximum sum of engine and electric machine torque.

In one example, the desired torque converter impeller speed in a pre-launch phase of launch mode is a speed where curve 302 is a maximum value, namely N1. By adjusting torque converter impeller speed to speed N1, engine speed and electric machine speed are pre-adjusted to a speed where maximum powertrain output may be provided so that engine speed does not have to accelerate before reaching speed N1 when the vehicle begins to accelerate from zero speed during the vehicle launch. By operating the engine and electric machine at speed N1, the combined or summed torque capacity of the engine and the electric machine (e.g., maximum torque the engine and electric machine may output together) is greater than the summed or combined torque output capacity of the engine and the electric machine operating at any speed other than speed N1. As such, operating the engine and electric machine at speed N1 just before the vehicle brake is released while the vehicle is not moving may enable maximum powertrain torque output to be achieved sooner after the brake pedal is released, thereby improving vehicle acceleration.

In another example, where N2 is a stall speed of a torque converter, the desired torque converter impeller speed in the pre-launch phase of launch mode is a speed N3 that is a speed within a threshold speed of the stall speed N2 of the torque converter for a threshold amount of braking torque applied to driven wheels. The stall speed of the torque converter is a torque converter impeller speed where vehicle wheels begin to rotate, and the stall speed may be responsive to an amount of braking torque applied to driven vehicle wheels (e.g., wheels that are supplied torque via the engine or electric machine). For example, if vehicle brakes are not applied, the vehicle may begin to move from zero speed when torque converter impeller speed is 800 RPM. On the other hand, if 50 N-m of braking torque is applied to driven wheels via friction brakes, the torque converter stall speed may be raised to 900 RPM, and then the friction braking torque may be overcome by torque transmitted through the torque converter so that the vehicle wheels begin to move. Thus, by adjusting torque converter impeller speed to a speed that is within a threshold speed of a torque converter stall speed, the powertrain may be pre-adjusted to conditions where torque converter efficiency increases so that vehicle acceleration may be improved after the vehicle brakes are released.

In another example, where N4 is a stall speed of a torque converter, the desired torque converter impeller speed in the pre-launch phase of launch mode is speed N1, which is a speed within a threshold speed of the stall speed N4 of the torque converter for a threshold amount of braking torque applied to driven wheels. Thus, the powertrain speed at which a maximum powertrain torque is available may be the desired torque converter impeller speed if the torque converter stall speed is greater than the speed where by adjusting torque converter impeller speed to a speed that is within a threshold speed of a torque converter stall speed, the powertrain may be pre-adjusted to conditions where torque converter efficiency increases so that vehicle acceleration may be improved after the vehicle brakes are released.

Referring now to FIG. 4, an example hybrid vehicle launch in a performance launch mode is shown. The operating sequence may be provided via the system of FIGS. 1 and 2 according to the method of FIG. 5. The plots of FIG. 4 are time aligned to show each of the parameters at the same instants in time. Vertical markers T0-T3 represent times of interest in the sequence.

The first plot from the top of FIG. 4 is a plot of brake pedal position versus time. The vertical axis represents brake pedal position and brake pedal position (e.g., trace 402) increases in the direction of the vertical axis arrow. Braking torque applied to driven wheels increases as brake pedal position increases. The horizontal axis represents time and time increases from the left side of the figure to the right side of the figure. Horizontal line 403 represents a threshold brake pedal position that provides a threshold braking torque to driven wheels that must be exceeded to enter performance launch mode. The threshold brake pedal position may vary for vehicle operating conditions.

The second plot from the top of FIG. 4 is a plot of accelerator pedal position versus time. The vertical axis represents accelerator pedal position and accelerator pedal position (e.g., trace 404) increases (e.g., is applied or depressed further) in the direction of the vertical axis arrow. The horizontal axis represents time and time increases from the left side of the plot to the right side of the plot. The horizontal axis represents time and time increases from the left side of the figure to the right side of the figure. Horizontal line 405 represents a threshold accelerator pedal position that requests a threshold torque at driven wheels that must be exceeded to enter performance launch mode. The threshold accelerator pedal position may vary for vehicle operating conditions.

The third plot from the top of FIG. 4 is a plot of engine operating state versus time. The vertical axis represents engine operating state and the engine is started and combusting air and fuel when trace 406 is a higher level near the vertical axis arrow. The engine is not started when trace 406 is near the horizontal axis. The horizontal axis represents time and time increases from the left side of the plot to the right side of the plot.

The fourth plot from the top of FIG. 4 is a plot of desired torque converter impeller speed (solid line 408), torque converter turbine speed (dash double dot line 412), and actual torque converter impeller speed versus time (dashed line 410). The desired torque converter impeller speed and the actual torque converter impeller speed are equal when only the desired torque converter impeller speed is visible. The vertical axis represents speed and speed increases in the direction of the vertical axis arrow. The horizontal axis represents time and time increases from the left side of the plot to the right side of the plot.

The fifth plot from the top of FIG. 4 is a plot of engine torque (dashed dot line 414), desired torque converter impeller torque (dashed line 416), and electric machine torque (solid line 418) versus time. The vertical axis represents torque and torque increases in the direction of the vertical axis arrow. The horizontal axis represents time and time increases from the left side of the plot to the right side of the plot. Traces values above the horizontal axis are positive and trace values below the horizontal axis are negative.

The sixth plot from the top of FIG. 4 is a plot of wheel slip (line 420) versus time. The vertical axis represents wheel slip and wheel slip increases in the direction of the vertical axis arrow. The horizontal axis represents time and time increases from the left side of the plot to the right side of the plot.

At time T0, the accelerator pedal position is not applied and the brake pedal is applied to a level that is greater than threshold 403. Therefore, the vehicle is not in performance launch mode. The engine is not running and its rotation is stopped. The torque converter impeller speed is rotating at a lower speed equivalent to the desired torque converter impeller speed. The torque converter is rotated via the electric machine since the engine is stopped. The torque converter turbine is not moving. The desired torque converter impeller torque is at a low value so that the transmission pump may be rotated and supply transmission fluid to the driveline disconnect clutch and the transmission clutches. The engine torque is zero since the engine is not started and wheel slip is zero.

At time T1, the driver (not shown) applies the accelerator pedal to a position that is greater than threshold 405, thereby activating performance launch mode. The engine is started and it combusts air and fuel in response to activating the performance launch mode. The desired torque converter impeller speed is increased to a second speed in response to entering performance launch mode, and the actual torque converter impeller speed is increased via increasing the desired torque converter impeller torque. The second speed may be one of the speeds described in the discussion of FIG. 2. The engine torque increases and the electric machine torque is adjusted to a negative torque so that when engine torque and electric machine torque are added together, the desired torque converter impeller torque is provided. The torque converter turbine speed is zero and the vehicle is not moving (not shown). Further, there is no wheel slip.

At time T2, the driver (not shown) releases the brake pedal while the accelerator pedal position is maintained. As a result, the vehicle launch begins and the torque converter turbine speed begins to increase. The engine remains activated and it supplies torque to the torque converter impeller. The negative electric machine torque is transitioned to a positive electric machine torque in response to the desired torque converter torque increasing. The engine torque remains at its same level prior to time T2. The desired torque converter impeller speed and actual torque converter impeller speed remain constant. The wheels are not slipping.

Between time T2 and time T3, the wheels begin to slip and the electric machine torque is modulated to control wheel slip and the engine torque remains constant. The torque converter turbine speed continues to increase and the desired torque converter impeller speed and actual torque converter impeller speed remain constant. The engine torque changes by a small amount and the brake, accelerator, and engine remain in their respective states.

At time T3, the torque converter turbine speed is within a threshold speed of torque converter speed, which causes the vehicle to exit launch mode and enter drive mode. The engine and the electric machine provide the desired torque converter impeller torque and the torque converter turbine speed continues to increase as the torque converter impeller speed increases. Wheel slip has ceased by time T3.

In this way, engine torque and electric machine torque may be adjusted to improve vehicle launch and performance. Adjusting torque converter impeller speed allows the vehicle to prepare for a performance mode launch. In this particular sequence, the electric motor torque is negative during the pre-launch stage, which allows engine torque to be converted into electrical energy. However, electric machine torque may be zero or positive during other launch conditions.

Figure 5:
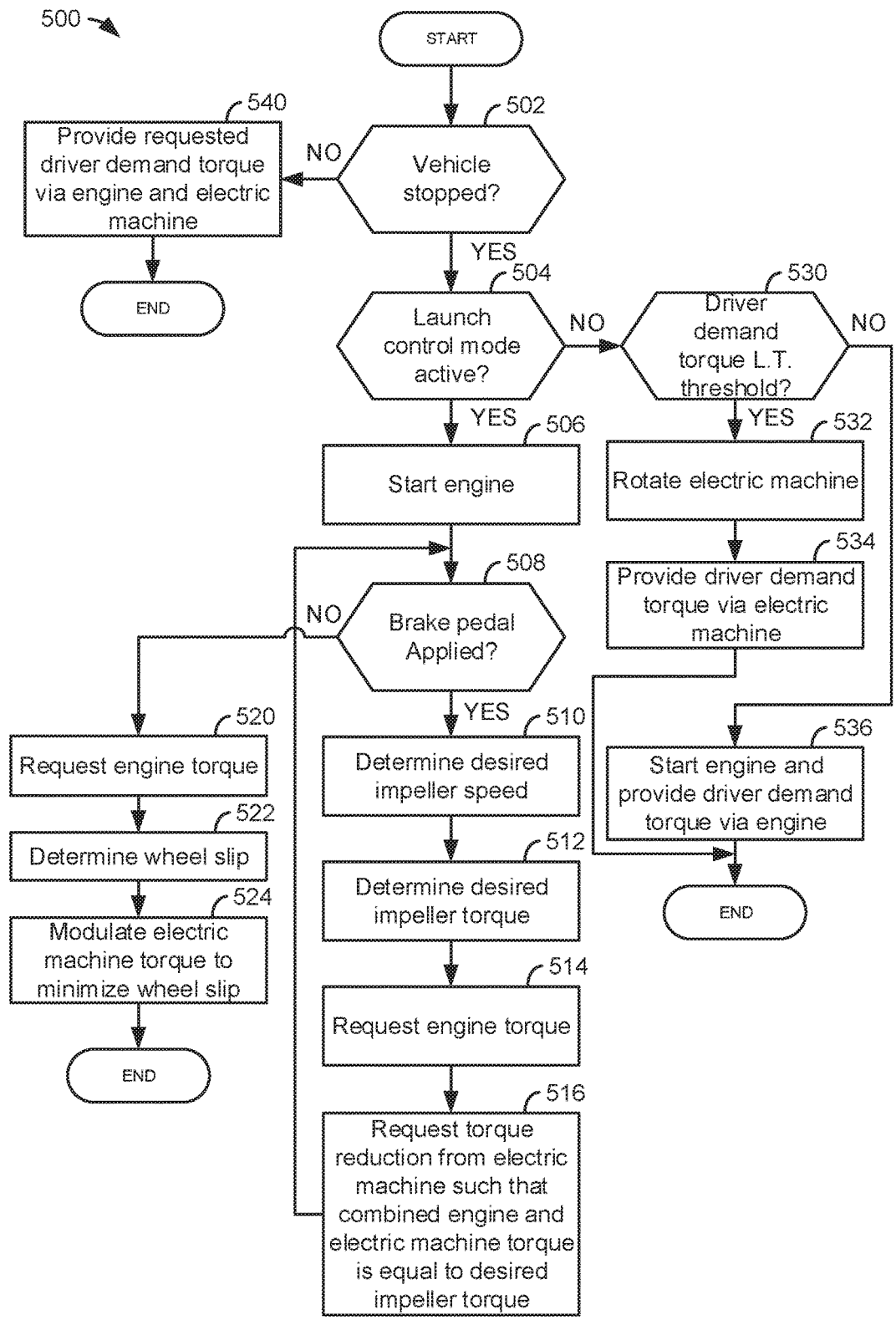
FIG. 5 is a flowchart of a method to operate a hybrid vehicle powertrain or driveline.

Referring now to FIG. 5, a method for operating a vehicle powertrain is shown. At least portions of method 500 may be implemented as executable controller instructions stored in non-transitory memory. Additionally, portions of method 500 may be actions taken in the physical world to transform an operating state of an actuator or device.

At 502, method 500 judges if the vehicle is stopped. Method 500 may judges that the vehicle is stopped responsive to controller input from one or more wheel speed sensors. The vehicle is stopped when the vehicle is not moving. If method judges that the vehicle is stopped, the answer is yes and method 500 proceeds to 504. Otherwise, the answer is no and method 500 proceeds to 540.

At 540, method 500 provides the requested driver demand torque via torque output from the engine and the electric machine (e.g., ISG 240). In one example, the driver demand torque is a torque requested by a human or autonomous driver. If a human makes the driver demand torque request, the driver demand torque request may be a function of vehicle speed and accelerator pedal position. In particular, accelerator pedal position and vehicle speed may index or reference a table or function of empirically determined driver demand values. The table or function outputs the driver demand. The driver demand torque may be a torque request at the torque converter impeller or at the vehicle wheels. Logic and functions referenced by state of battery charge, battery temperature, driver demand torque, and other parameters may allocate a first portion of the requested driver demand torque to the engine and a second portion of the requested driver demand torque to the electric machine. The electric machine and engine are commanded to provide the driver demand torque and torque to charge batteries or power other devices. Method 500 proceeds to exit.

At 504, method 500 judges if performance mode launch control mode is activated. In one example, performance mode launch control may be activated in response to an accelerator pedal position exceeding a threshold value and a brake pedal position or driven wheel braking request exceeding a threshold value. Thus, to enter performance mode launch control, method 500 may require contemporaneously applying the accelerator pedal and the brake pedal. The threshold driven wheel braking amount may be a braking torque that is greater than maximum engine torque, a braking torque that provides a desired torque converter stall speed, or another predetermined braking torque amount. The accelerator pedal position threshold may be a position that represents a threshold driver demand torque (e.g., 75% of maximum engine torque). If method 500 judges that conditions are present to enter performance launch mode, the answer is yes and method 500 proceeds to 506. Otherwise, the answer is no and method 500 proceeds to 530.

At 530, method 500 judges if driver demand torque is greater than a threshold. If method 500 judges that driver demand torque is greater than a threshold, the answer is yes and method 500 proceeds to 532. Otherwise, the answer is no and method 500 proceeds to 536.

If the brake and accelerator pedal are contemporaneously applied, torque requested via the accelerator pedal is cancelled via torque requested via the brake pedal. For example, if the driver requests 100 N-m of torque via the accelerator pedal and 50 N-m of torque via the brake pedal, the powertrain provide 50 N-m of torque and the brakes are not applied. Similarly, if the driver requests 100 N-m of torque via the accelerator pedal and 150 N-m of torque via the brake pedal, 50 N-m of torque is applied to the wheels and powertrain torque is zero or −50 N-m if the electric machine is providing the braking torque.

At 532, method 500 activates the electric machine if it is not activated and rotates the torque converter impeller to rotate the transmission pump. The transmission pump supplies fluid to transmission clutches and the driveline disconnect. The engine may be shut off and stop rotating when the electric machine is activated. However, if battery state of charge is less than a threshold, the engine may be activated to rotate the transmission pump and charge the battery via the electric machine. The transmission pump is rotated at a speed equal to or above a speed where the pump provides hydraulic line pressure greater than a threshold pressure that is sufficient to fully close transmission clutches and the driveline disconnect clutch. Method 500 proceeds to 534.

At 534, method 500 provides the driver demand torque via the electric machine. Thus, the electric machine rotates the transmission pump and provides the driver demand torque to propel the vehicle. Method 500 proceeds to exit.

At 536, method 500 starts the engine if the engine is not started and provides the driver demand torque via the engine. Further, if the driver demand torque is sufficiently high, the electric machine and the engine may provide the driver demand torque. If the engine may provide the driver demand torque without the electric machine, the electric machine may be shut off. Method 500 proceeds to exit.

At 506, method 500 starts the engine if the engine is stopped. The engine may be stopped during vehicle deceleration or while the vehicle is stopped to conserve fuel before performance launch mode is entered. Method 500 proceeds to 508 after the engine is started.

At 508, method 500 judges whether or not the brake pedal is still applied after entering performance launch mode. Further, in some examples, method 500 determines if the brake pedal is applied at a position that is equivalent to or greater than the position the brake pedal was applied to entering the performance launch mode. If method 500 judges that the brake pedal is still applied, or alternatively, applied to the level it was applied when performance launch mode was entered, the answer is yes and method 500 proceeds to 510. Otherwise, the answer is no and method 500 proceeds to 520.

At 520, method 500 provides the driver demand torque requested via the engine to the transmission impeller. If the requested driver demand torque is greater than what may be provided by the engine alone, torque from the electric machine is provided to the driveline to meet the driver demand torque. The engine torque may be increased via adjusting throttle opening amount and fuel injection amount. The electric machine torque may be increased via supplying additional current to the electric machine. The engine may be operated at wide open throttle to provide the desired engine torque. Method 500 proceeds to 522.

At 522, method 500 determines slip of driven wheels. In one example, method 500 determines slip of rear driven wheels according to the equation:

$$\Delta\omega = \omega_{whl}^{rr} - \omega_{whl}^{fr}$$

where $\Delta\omega$ is the difference in speed between front non-driven wheels and rear driven wheels, or the wheel slip of the driven wheel, $\omega_{whl}^{rr}$ is rear wheel speed, and $\omega_{whl}^{fr}$ is front wheel speed. Alternatively, wheel slip may be determined via the following equation:

$$\Delta\omega = \omega_{whl} - v_{veh}/r$$

where $\Delta\omega$ is the wheel slip of the driven wheel, $\omega_{whl}$ is rear wheel speed, $v_{veh}$ is vehicle speed, and r is the wheel radius. Method 500 proceeds to 524 after driven wheel slip is determined.

At 524, method 500 determines torque of the electric machine. In one example, the electric machine torque is determined via the following equations:

$$\tau_{mtr}^{\Delta} = f(K_p^{red}, \Delta\omega) \text{ if } \Delta\omega > \text{threshold}$$

$$\tau_{mtr}^{\Delta} = f(K_p^{inc}, \Delta\omega) \text{ if } \Delta\omega < \text{threshold}$$

$$\tau_{mtr}^{fnl} = \tau_{mtr}^{\Delta} + \tau_{dsd}$$

where $\tau_{mtr}^{\Delta}$ is the electric machine torque adjustment for wheel slip or absence of wheel slip, $\Delta\omega$ is slip of driven wheels, $-K_p^{red}$ is a gain (real number) when slip exceeds a threshold, $K_p^{inc}$ is a gain (real number) when slip is less than a threshold, $\Sigma_{mtr}^{fnl}$ is the commanded electric machine torque, and $\tau_{dsd}$ is the desired electric machine torque based on driver demand torque. Thus, if wheel slip is greater than a threshold, the electric machine torque is reduced to reduce wheel slip. If wheel slip is less than a threshold, electric machine torque is increased to increase vehicle acceleration. Method 500 proceeds to exit.

At 510, method 500 determines a desired torque converter impeller speed. The desired torque converter impeller speed is predetermined and may depend on engine attributes (e.g., maximum torque, engine speed that the engine makes maximum torque, etc.), electric machine attributes (e.g., maximum electric machine torque, base electric machine speed, etc.), and torque converter attributes (e.g., torque converter stall speed).

In one example, the desired torque converter impeller speed in a pre-launch phase of launch mode is a speed where a combined maximum engine torque curve and a maximum electric machine torque curve is a maximum (e.g., N1 in FIG. 3). When torque converter impeller speed is adjusted to speed N1, engine speed and electric machine speed are pre-adjusted to a speed where maximum powertrain output may be provided so that engine speed does not have to accelerate before reaching speed N1 when the vehicle begins to accelerate from zero speed during the vehicle launch.

In another example, the desired torque converter impeller speed in the pre-launch phase of launch mode is a speed (e.g., N3 in FIG. 3) that is a speed within a threshold speed of the stall speed of the torque converter for a threshold amount of braking torque applied to driven wheels. Further, since torque converter stall speed may vary with braking torque of driven wheels, the speed may be a function of braking torque. In one example, a table or function of empirically determined speed values is indexed or referenced by braking torque of driven wheels. The table or function outputs a desired torque converter impeller speed.

In another example, the desired torque converter impeller speed in the pre-launch phase of launch mode is speed N1 where maximum powertrain torque may be produced (e.g., N1 of FIG. 3) when the torque converter stall speed is greater than the speed where maximum powertrain torque may be produced. Method 500 proceeds to 512 after the desired torque converter impeller speed is determined.

At 512, method 500 determines the desired torque converter impeller torque. In one example, the desired impeller torque to maintain desired torque converter impeller speed can be determined using a combination of torque converter model and feedback controller based on present impeller speed and target impeller speed via the equation:

$$\tau_{des} = \tau_{imp}^{TC} + K_p(\omega_{des} - \omega_{imp}) + K_i \int(\omega_{des} - \omega_{imp})dt$$

where $\tau_{des}$ is the desired torque converter impeller torque to keep the impeller at desired impeller speed, $\tau_{imp}^{TC}$ is the predicted torque to keep impeller spinning at desired speed target from torque converter model, $\omega_{des}$ is the desired/target impeller speed, $\omega_{imp}$ is the actual impeller speed and, $K_p$ and $K_i$ are the controller gains (e.g., real numbers) for a proportional/integral (PI) controller. Predicted torque to spin impeller at vehicle launch can be determined from following equations:

$$\tau_{imp}^{TC} = \left(\frac{\omega_{imp}}{K(SR)}\right)^2$$

$$SR = \frac{\omega_{tur}}{\omega_{imp}}$$

where $\omega_{tur}$ is the turbine speed, and SR is the torque converter speed ratio. Method 500 proceeds to 514.

At 514, method 500 requests the driver demand torque requested via the engine to the transmission impeller. The engine is commanded to the drive demand torque. The engine torque may be increased via adjusting throttle opening amount and fuel injection amount. The engine torque may be adjusted responsive to battery state of charge to meet the driver demand torque. Method 500 proceeds to 516.

At 516, method 500 determines electric machine torque. The electric machine torque is determined via the equation:

$$\tau_{mtr}^{req} = \tau_{des} - \tau_{eng}$$

where $\tau_{mtr}^{req}$ is the requested electric machine torque and $\tau_{eng}$ is the actual engine torque. The electric machine torque may be increased via supplying additional current to the electric machine. The electric machine torque may be adjusted responsive to battery state of charge to meet the driver demand torque. Method 500 returns to 508 after the electric machine is commanded to the desired electric machine torque.

Thus, the method of FIG. 5 provides for a vehicle operating method, comprising: adjusting speed of a torque converter impeller from a first speed to a second predetermined speed in response to contemporaneously applying a brake pedal and an accelerator pedal. The method includes where the second predetermined speed is a speed where an engine and an electric machine have capacity to provide a combined first torque, the combined first torque greater than combined torque output capacity of the engine and the electric machine operating at any speed other than the second speed. The method includes where the second predetermined speed is a function of braking torque of driven wheels, and further comprising: starting an engine in response to contemporaneously applying the brake pedal and the accelerator pedal.

In some examples, the method further comprises adjusting torque of the engine and torque of an electric machine after starting the engine to rotate the torque converter impeller at the second speed. The method includes where the torque of the engine and torque of the electric machine are adjusted responsive to battery state of charge. The method includes where the first speed is a speed of a pump below which the pump provides hydraulic line pressure less than a threshold pressure. The method includes where the threshold pressure is a pressure sufficient to fully close transmission clutches.

The method of FIG. 5 also provides for a vehicle operating method, comprising: adjusting speed of a torque converter impeller from a first speed to a second predetermined speed in response to contemporaneously applying a brake pedal and an accelerator pedal; and adjusting output torque of an engine to provide a threshold torque in response to releasing the applied brake pedal. The method includes where the threshold torque is greater than engine torque at any engine speed other than an engine speed where the threshold torque is provided. The method includes where the second predetermined speed is a threshold speed based on a stall speed of a torque converter, the stall speed based on driven wheel braking torque. The method includes where adjusting speed of the torque converter impeller from the first speed to the second predetermined speed includes adjusting speed of the torque converter impeller only after accelerator pedal position exceeds a threshold while a vehicle that includes the engine is stopped.

In some examples, the method includes where adjusting speed of the torque converter impeller from the first speed to the second predetermined speed includes adjusting speed of the torque converter impeller only after a threshold driven wheel braking torque is provided by applying the brake pedal. The method further comprises canceling accelerator pedal based torque via brake pedal torque in response to accelerator pedal position being less than a threshold. The method further comprises limiting wheel slip to less than a threshold via modulating torque of an electric machine after releasing the brake pedal. The method further comprises adjusting torque of an electric machine to provide a desired torque converter impeller torque while contemporaneously applying the brake pedal and the accelerator pedal, the desired torque converter impeller torque is a torque that rotates the torque converter impeller at the second predetermined speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. A vehicle operating method, comprising:
adjusting speed of a torque converter impeller from a first speed to a second predetermined speed in response to contemporaneously applying a brake pedal and an accelerator pedal, where the second predetermined speed is a speed where an engine and an electric machine have capacity to provide a combined first torque, the combined first torque greater than combined maximum torque output capacity of the engine and the electric machine operating at any speed other than the second predetermined speed.

2. The method of claim 1, where the second predetermined speed is a function of braking torque of driven wheels, and further comprising:
starting an engine in response to contemporaneously applying the brake pedal and the accelerator pedal.

3. The method of claim 2, further comprising adjusting torque of the engine and torque of the electric machine after starting the engine to rotate the torque converter impeller at the second predetermined speed.

4. The method of claim 3, where the torque of the engine and the torque of the electric machine are adjusted responsive to a battery state of charge.

5. A vehicle operating method, comprising:
adjusting speed of a torque converter impeller from a first speed to a second predetermined speed in response to contemporaneously applying a brake pedal and an accelerator pedal, where the first speed is a speed of a pump equal to or above which the pump provides hydraulic line pressure greater than a threshold pressure.

6. The method of claim 5, where the threshold pressure is a pressure sufficient to fully close transmission clutches.

7. A vehicle operating method, comprising:
adjusting speed of a torque converter impeller from a first speed to a second predetermined speed in response to contemporaneously applying a brake pedal and an accelerator pedal; and
adjusting output torque of an engine to provide a threshold torque in response to releasing the applied brake pedal, where adjusting speed of the torque converter impeller from the first speed to the second predetermined speed includes adjusting speed of the torque converter impeller only after accelerator pedal position exceeds a threshold while a vehicle that includes the engine is stopped.

8. The method of claim 7, where the threshold torque is greater than maximum engine torque at any engine speed other than an engine speed where the threshold torque is provided.

9. The method of claim 7, where the second predetermined speed is a threshold speed based on a stall speed of a torque converter, the stall speed based on driven wheel braking torque.

10. The method of claim 7, where adjusting speed of the torque converter impeller from the first speed to the second predetermined speed includes adjusting speed of the torque converter impeller only after a threshold driven wheel braking torque is provided by applying the brake pedal.

11. The method of claim 7, further comprising reducing torque delivered to a powertrain via brake pedal torque.

12. The method of claim 7, further comprising limiting wheel slip to less than a threshold via modulating torque of an electric machine after releasing the brake pedal.

13. The method of claim 7, further comprising adjusting torque of an electric machine to provide a desired torque converter impeller torque while contemporaneously applying the brake pedal and the accelerator pedal, the desired torque converter impeller torque is a torque that rotates the torque converter impeller at the second predetermined speed.

14. A system, comprising:
an engine;
a motor/generator;
a transmission mechanically coupled to the engine and the motor/generator, the transmission including a torque converter impeller; and
a controller including executable instructions stored in non-transitory memory to:
adjust speed of the torque converter impeller from a first speed to a second predetermined speed in response to contemporaneously applying a brake pedal to provide greater than a threshold amount of driven wheel braking torque and applying an accelerator pedal to a position that is greater than a threshold; and
cancel torque requested via the accelerator pedal in response to torque requested via the brake pedal when the accelerator pedal is at a position that is less than the threshold.

15. The system of claim 14, further comprising additional instructions stored in non-transitory memory to operate the engine at wide open throttle in response to releasing the applied brake pedal.

16. The system of claim 15, further comprising additional instructions stored in non-transitory memory to modulate torque of an electric machine to control wheel slip in response to releasing the applied brake pedal.

17. The system of claim 14, further comprising additional instructions stored in non-transitory memory to adjust torque of the motor/generator to provide a desired torque converter impeller torque that rotates the torque converter impeller at the second predetermined speed.

* * * * *